United States Patent [19]
Flint et al.

[11] Patent Number: 6,112,098
[45] Date of Patent: Aug. 29, 2000

[54] CORDLESS OR WIRELESS SYSTEM PROTOCOL FOR PROVIDING RELIABLE CHANNEL CONNECTIONS

[75] Inventors: Eprhaim Bemis Flint, Garrison, N.Y.; Brian Paul Gaucher, New Milford, Conn.; Young Hoon Kwark, Chappaqua, N.Y.; Hiroshi Yoshinaga, Umi-machi, Japan; Nobutoyo Nakano, Kasaga, Japan; Tsutomu Iwasaki, Kasaaaga, Japan; Hidenao Hamada, Dazaif, Japan

[73] Assignee: International Business Machines Corporation, Armonk, N.Y.

[21] Appl. No.: 08/979,117

[22] Filed: Nov. 26, 1997

[51] Int. Cl.$^7$ ....................................................... H04B 1/38
[52] U.S. Cl. ............................................ 455/464; 455/514
[58] Field of Search .................................... 455/464, 450, 455/455, 434, 509, 511, 452, 513, 514, 515

[56] References Cited

U.S. PATENT DOCUMENTS

| | | | |
|---|---|---|---|
| 4,977,612 | 12/1990 | Wilson | 455/166 |
| 5,504,803 | 4/1996 | Yamada et al. | 379/59 |
| 5,625,878 | 4/1997 | Lopponen et al. | 455/34.1 |
| 5,774,805 | 6/1996 | Zicker | 455/426 |
| 5,778,318 | 1/1995 | Talarmo et al. | 455/452 |
| 5,828,963 | 3/1995 | Grandhi et al. | 455/450 |
| 5,832,367 | 12/1995 | Bamburak et al. | 455/436 |

FOREIGN PATENT DOCUMENTS

| | | |
|---|---|---|
| 07236173 | 9/1995 | Japan . |
| 08149555 | 6/1996 | Japan . |

*Primary Examiner*—Edward F. Urban
*Assistant Examiner*—Tilahun Gesesse
*Attorney, Agent, or Firm*—F. Chau & Associates, LLP

[57] ABSTRACT

A method of channel selection between a remote and a base for a cordless or wireless communication system includes the steps of creating a history table having channels assigned to columns and intervals assigned to rows, scanning the channels to determine if interference exists, recording the channels having interference for a given interval in the history table and determining which channel has the least amount of interference over a predetermined number of intervals to select the best channel for communications.

34 Claims, 8 Drawing Sheets

CORDLESS OR WIRELESS SYSTEM PROTOCOL FOR PROVIDING RELIABLE CHANNEL CONNECTIONS

BACKGROUND OF THE INVENTION

1. Field of the Invention

The present invention relates to a cordless or wireless system protocol and, more particularly, to a protocol for providing reliable channel connections.

2. Description of the Related Art

Improvements in cordless communication systems have made cordless communication accessible to a larger market. Although improvements in cordless phone systems have reduced cost and increased reliability, several problems still persist. Such problems include line noise and/or signal jamming. Interference on a phone line for a cordless or wireless phone is often intrusive and interrupts the conversation between parties.

The problem is multiplied when dealing with data communications. It is often imperative that data transferred over a wireless or cordless system be free from errors. Noise and signal jamming sometimes create errors in data transfer. Further, the communication may sometimes be terminated altogether if enough noise is present on the line.

Cordless and cellular phones are usually provided with a channel select feature wherein the user can search for a channel with low or reduced noise. However, when using a wireless modem, for example, it is important that the data transferred is correct which requires minimum noise. Modem transfers are often performed over longer periods of time and have a lower tolerance for data errors than voice phone communications.

It would be advantageous to provide the best available channel for data transmission over a wireless network or a cordless system. Therefore, a need exists for a protocol that searches for the best available channel for wireless or cordless communication and automatically updates the selection periodically to provide a more robust and reliable wireless communication system.

SUMMARY OF THE INVENTION

A method of channel selection between a remote and a base for a cordless or wireless communication system includes the steps of creating a history table having channels assigned to columns and intervals assigned to rows, scanning the channels to determine if interference exists, recording the channels having interference for a given interval in the history table and determining which channel has the least amount of interference over a predetermined number of intervals to select the best channel for communications.

In other methods, an RSSI may be included and the step of scanning the channels may include outputting a voltage from the RSSI proportional to the interference for each channel. The step of creating a history table may include the steps of creating a first history table for the remote, creating a second history table for the base and logically combining the first history table with the second history table. At least one OR gate may be included and the step of logically combining may include logically combining by an OR gate, interference data in the rows and the columns of the first history table with interference data in the corresponding rows and columns of the second history table. The step of recording the channels may further include the step of creating a weighing factor based on the relative levels of interference to determine the best channel for communications.

In still other methods, the step of determining which channel has the least amount of interference may include determining a backup channel having the least amount of interference of the remaining channels. The step of communicating between the remote and the base on the channel having the least amount of interference may also be included. The steps of periodically updating the history table to determine an updated channel having the least amount of interference and communicating between the remote and base on the updated channel may be included.

The remote may be a hand held device, and the base may connect to a public switched telephone network (PSTN). The remote may be a modem, and the base may be a computer and may connect to a public switched telephone network (PSTN). The history table may have a predetermined number of rows for a predetermined number of intervals and may include the step of erasing interference data for the oldest interval to allow interference data for a new interval to be recorded in the history table.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to a wireless protocol that can be used with either a cordless modem or cordless phone as well as a PDA (Personal Digital Assistant) or other wireless devices for various applications. It provides a robust, reliable communications channel with which data or voice can be exchanged between a remote or hand held device and a base station, where the data or voice can ultimately be transported to/from a public switched telephone network (PSTN) or remain locally in the base station. As well as providing a underlying communications link layer, the protocol of the present invention uses a unique continuously updated interference detection and arbitration scheme to provide extremely reliable connections under both noise and jamming conditions. This becomes very important when operating in frequency bands that are becoming increasingly crowded. A system protocol includes the use of a remote or hand held unit and a base station, though it is expandable, for example, to multiple remote units. The application of the protocol can be as simple as a cordless phone communicating to its base station or more complex as in a PDA communicating to a host computer acting at the base station.

There are two main layers to the link between the base and the remote. The first is an order wire or low data rate link which the units can exchange information regarding the environment. The second is the communication link itself where information other than environmental information is exchanged. This is where voice or system relevant data may be exchanged. The first layer communication channel can be any of a variety of modulation schemes such as, but not limited to analog FM, AM, digital M-ary PSK, M-ary FSK, etc. The second layer communication channel can also be any of a variety of modulation schemes such as, but not limited to analog FM, AM, digital M-ary PSK, M-ary FSK, etc. The protocol of the present invention does not depend upon a specific choice, but rather the ability to communicate and exchange information.

Figure 6:
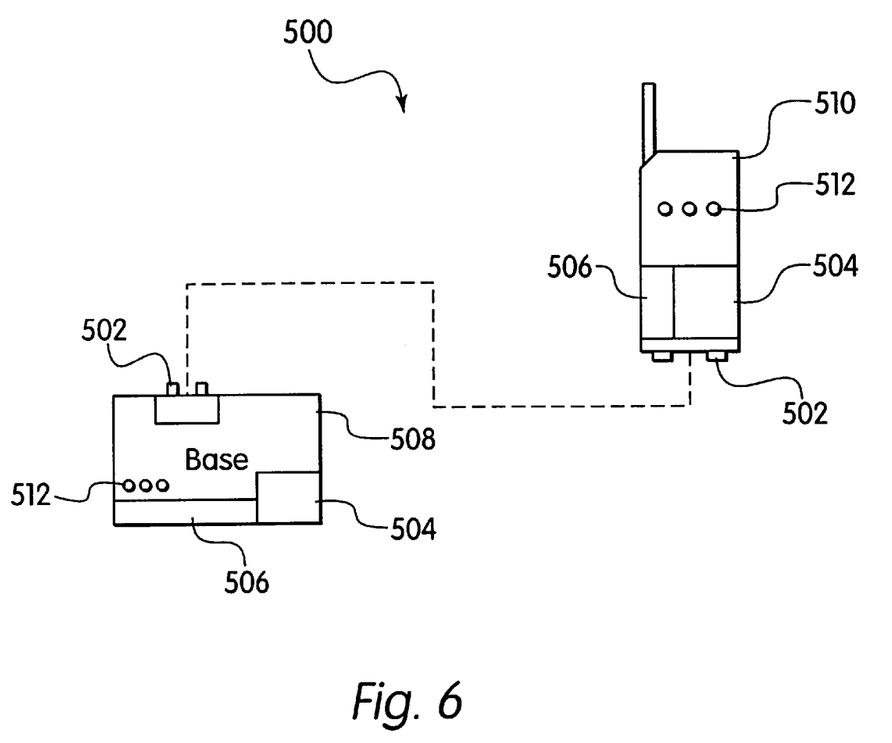
FIG. 6 is a block diagram showing a base station and a remote.

For illustration purposes, FIG. 6 shows a system 500 which is described herein. System 500 makes use of the protocol of the present invention. System 500 includes a single remote 510 and a base station 508. It is to be appreciated that base station 508 and remote 510 include, inter alia, LEDs 512, contacts 502, counters, radio devices, registers, and circuitry (shown as 506) and memory 504 as in known in the art. The example disclosed herein combines the use of a cordless phone and the transport of data. Other devices are contemplated, for example a wireless phone and base station. System 500 is illustrated in this example in three different modes. These include an idle mode, standby mode or active mode.

Figure 1:
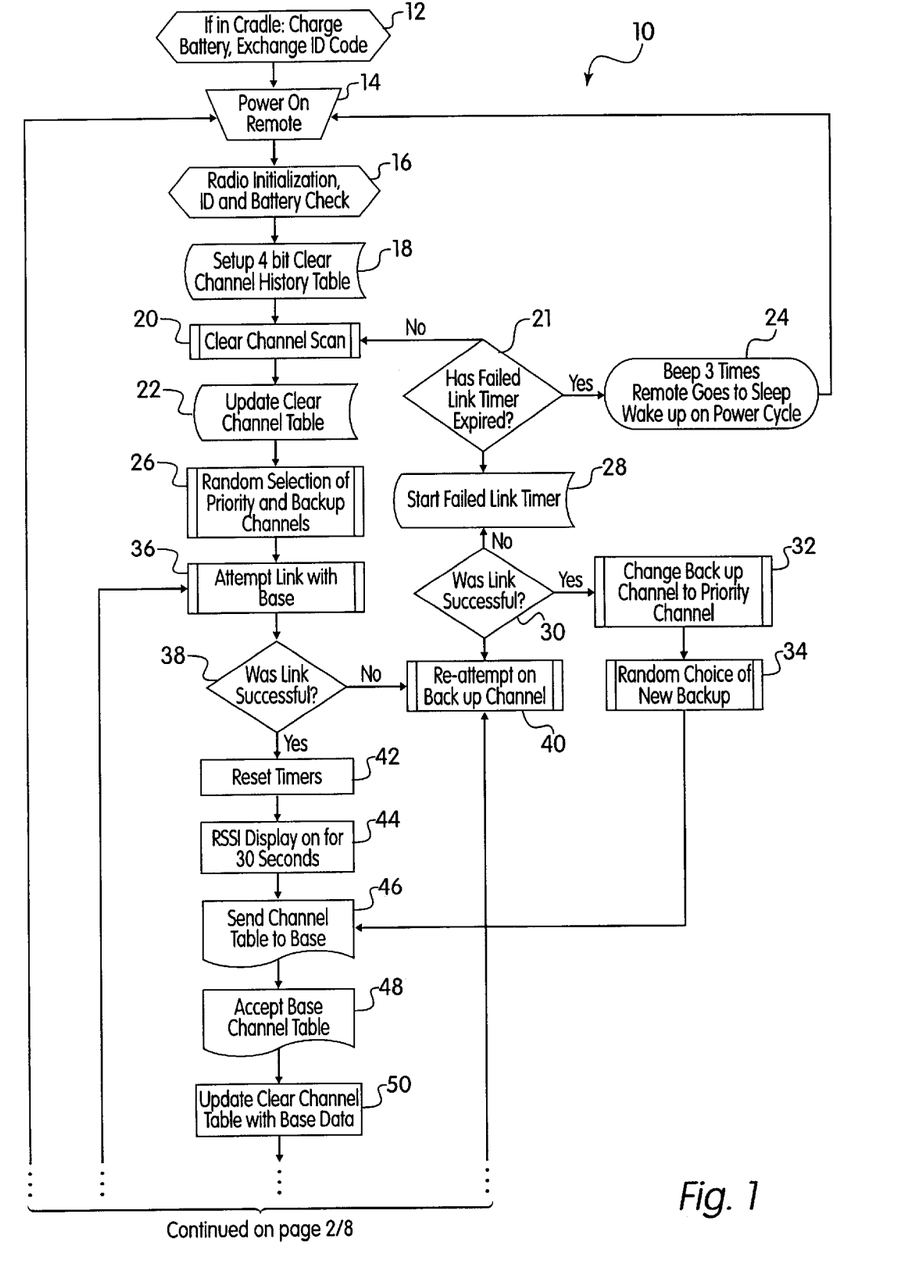
FIG. 1 is a block diagram of a protocol for a cordless or wireless system in accordance with the present invention.

Referring now to the drawings in which like numerals represent the same or similar components throughout the many views and initially to FIG. 1, a flow chart 10 of the protocol of the present invention. To start, the remote sits or is cradled on the base in a fashion that allows it to be in electrical contact with the base for the purposes of charging the battery or exchanging ID codes etc. This is considered the stowed position and idle mode as is represented in block 12. When the remote is removed from the cradle and switched on either manually or automatically, the remote is now considered in a standby mode. When a call is initiated from either the remote or from the base, the remote is considered in the active mode.

While the remote is on the cradle a charge current is fed through the cradle to remote contacts. In addition, each time the remote is placed into the cradle a new ID code is chosen at random from a $2^{12}$ range, for example, that is the range of ID codes has $2^{12}$ possibilities. Other ranges are contemplated and not limited to $2^{12}$ possibilities. This built in security ID code prevents unauthorized users from easily accessing some else's public switched telephone network (PSTN) line. When the remote is lifted off the cradle the charging stops. After the remote is powered on in block 14, a check is made in block 16 to determine that the battery voltage is adequate, if the battery voltage is adequate, the entire unit is initialized, i.e. all counters, a history table is established in block 18 for later use, radio devices like synthesizers, registers etc. are initialized, then the remote immediately begins a search algorithm in two dimensions. First, the remote checks to see if it has a valid ID Code. If the remote does not it flashes the LED's on the remote until it is powered off and returned to the cradle and a successful ID code is exchanged. If the remote contains a valid ID code, the remote next begins a frequency scan of all its available channels in block 20, in this example, ten channels. It does this by listening on each channel for a specified time. The "listening" mechanism is a received signal strength indicator (RSSI) that is included in the remote receiver. The RSSI is capable of determining the signal strength of like or unlike systems and noise for each channel. Since the base is not transmitting, the remote will know whether a channel is busy or clear. The RSSI voltage is directly proportional to noise or interference within a given channel. For example, say that in the first ten second interval, channels 1,3,4,7 are busy or in use, as illustrated in Table 1, whether from a like system or unlike system. This protocol recognizes that they are busy and fills in the history table. On the next ten second boundary, it might be that a new user came on channel 6, so the history table would add this to the list as represented by block 22. This goes on until the last six samplings have been filled in and each additional sampling will kick out the oldest. The system then weights all those channels that have been busiest the most and excludes them from the available choices. In this case, it is clear that at sampling N, the best channel is 5. The table is six deep, i.e. the history table keeps track of the last six scans as shown in the Table 1 below. The table is updated every ten seconds, for example, so the table has a total history of 1 minute. This 1 minute interval is illustrative other intervals are contemplated. The final time can be any time optimized on stochastic variables such as those proportional to frequency and usage scenarios.

A third dimension (not shown) may be added to the history table. The third dimension may be used to store relative strength of interference. The relative strength of interference may be used to create the weighting factor described above. The third dimension may include the actual voltage of the interference and in the extreme case of all channels being busy, choose the lowest level channel for communications.

TABLE 1

Remote Frequency History Table

| Interval | Chan 1 | Chan 2 | Chan 3 | Chan 4 | Chan 5 | Chan 6 | Chan 7 | Chan 8 | Chan 9 | Chan 10 |
|---|---|---|---|---|---|---|---|---|---|---|
| N − 5 | X |   | X | X |   |   | X |   |   |   |
| N − 4 | X |   | X | X |   | X | X |   |   |   |
| N − 3 | X |   | X | X |   | X | X | X | X | X |
| N − 2 | X | X |   | X |   | X | X |   | X | X |
| N − 1 | X |   | X |   |   |   |   | X | X | X |
| N |   | X | X | X |   |   |   | X |   | X |

As seen in Table 1, the optimum channel to chose would be channel 5, although channels 6, 9 and 7 would be the next preferential channels. In block 26, the weighing is based on two main parameters, first that the last channels scan show a channel to be available, i.e. unoccupied by anything, and second part of the weighting is to choose from the historically least busy as weighted by the actual interference level. This particular table is completed for the remote. The same procedure is completed for the base. So at start up this table is created and initialized, then updated every ten seconds until the units are powered off. After this table is created at start up, a random selection of the available best channels is made.

A second choice is also made in case the priority channel ends up jammed. At this point the remote will attempt a link with the base unit in block 36. The controller sets up the correct frequencies for the selected channel and sends an FSK preamble and code Omni-directionally. If a base is online i.e. listening, it will hear the remote's code and respond. The base is always in a listen mode unless it hears a remote unit's code at which point it responds with the appropriate acknowledgment code. If the remote receives this code, it acknowledges the receipt to the base unit and then the base waits for instructions from the remote. If the link was unsuccessful in block 38, the remote goes into a loop, randomly selecting a new channel from the list of backups in block 40 and re-attempting to connect with the base in blocks 30, 32 and 34. It will try three more times then go to blocks 28 and 21 and if unsuccessful the remote unit will beep three times in block 24 then go to standby mode. At this point the user may either re-try a connection in which case the attempt process begins again, or they can cycle the power and start over.

Assuming the link was successful, the remote and the base reset all their timers, and the remote goes into a signal quality mode in block 42. Its Range LED is light according to the signal strength of the signal received from the base unit. The LED turns green for a strong signal, amber for a weak signal and red for out of range. In block 44, the LED stays light for 30 seconds and then goes out automatically and the unit goes into stand by mode. The user can either use the LED status indicator to sample the signal strength and therefore link quality or they can go directly into a session.

During the link setup process, both the remote and base exchange frequency history tables in blocks 46 and 48 and update their own by logically "OR-ing" the tables together, that is, using a logical OR gate to combine the results, and locking out individually busy channels as well as mutually busy ones in block 50. After the channel tables have been updated, the remote unit randomly chooses in block 52 a timeout time, for example, between 8–12 minutes. This random time helps prevent synchronization with other systems in the area.

If the user does not attempt a link within the 30 second interval of block 44, the units go into standby mode in block 54. The remote unit can wake either by a user directed input such as initiation of a modem session in block 56 or the user setting up for an incoming call in blocks 60 and 62.

Standby Mode

Standby mode is a loop testing for whether the user has requested to attempt an outgoing call or whether the base station is trying to send an incoming call. In addition, it does house keeping functions like monitoring the battery in block 68, updating channel table history in block 70 and periodically i.e. every 8–12 minutes, contacting the base and exchanging channel table histories in blocks 74 and 76. If three 8–12 minute periods go by without a completed exchange then the remote unit beeps four times in block 80 and goes to sleep in block 86 until the remote power is cycled off/on (block 14). This is done to conserve battery power. If while in stand by mode, the user attempts a modem session, or in general, an off -hook request in block 56, this prompts the remote to go into what is called an Active session or mode in block 58.

Another feature is the remote scanning the channels and updating the table with clear or busy information. If the primary or priority channel is detected as busy, the remote initiates a link with the base in order to report this condition although it uses the established back up channel to do the communication. There is a built in random delay prior to attempting to report to the base. This helps prevent collisions on the channel and to minimize the probability of multi-system synchronization.

Remote Active Session or Mode

Figure 2:
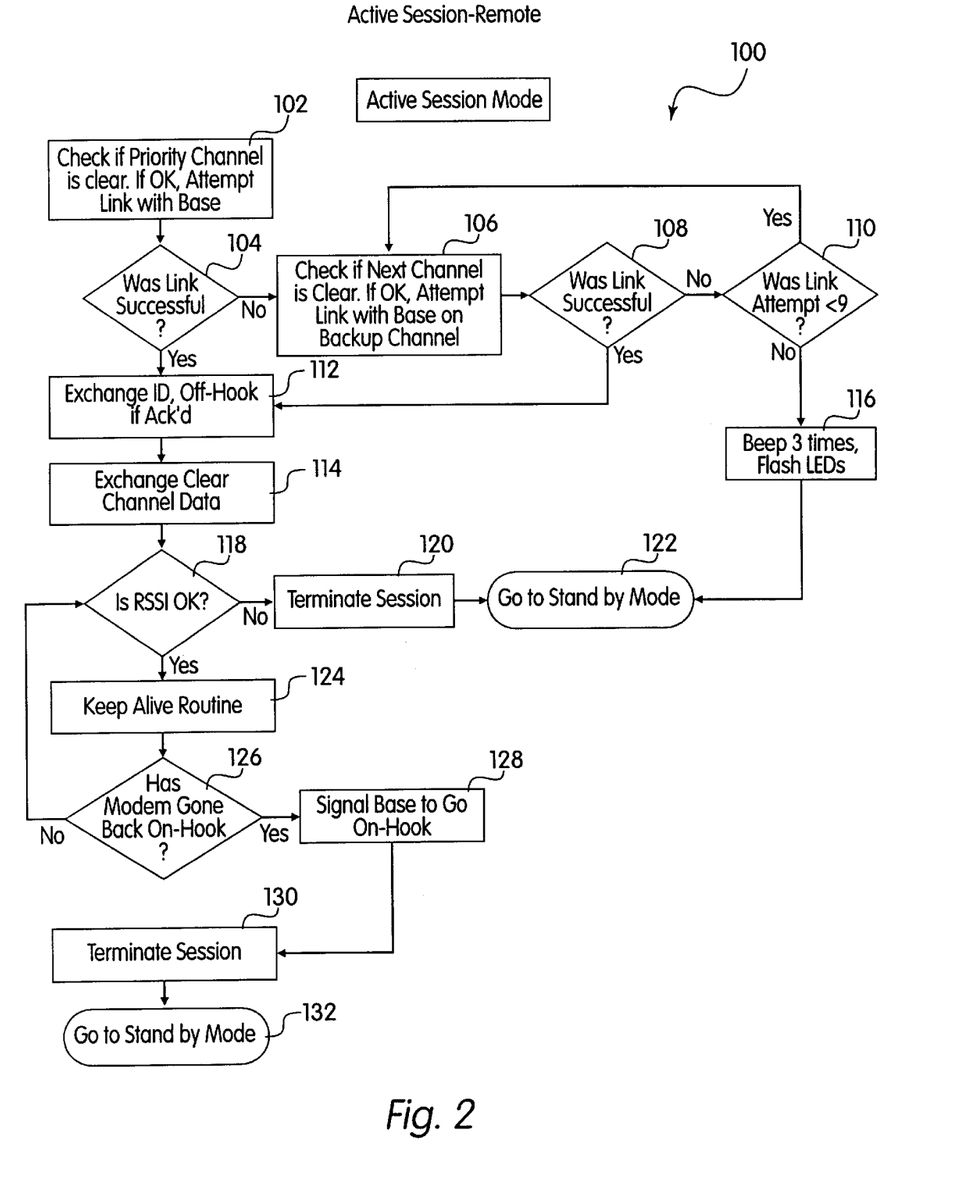
FIG. 2 is a block diagram of an active session mode for the cordless or wireless system in accordance with the present invention.

Referring to FIG. 2, the remote enters the active session mode and scans the channels to make sure the selected priority channel is not busy in block 102. If the priority channel is clear the remote attempts a link with the base. The success of the link is tested in block 104. If the link is successful, the remote exchanges the ID code for security reasons and then acknowledges the off-hook request code in block 112. The remote then exchanges clear channel information in block 114. Then the remote checks the signal quality of the link in block 118, if it is acceptable it goes into a session in block 124, i.e. activates the off-hook request to the PSTN. Now the remote monitors the RSSI and as long as it remains at an acceptable level, the remote leaves the link active. If the signal level drops below acceptable level, for 30 seconds, the remote will terminate the session in block 120, ending the active link and returning to stand by mode in block 122. The stand by mode is the same as described above. If the RSSI level remains OK, but the on-hook command is issued in block 126, the remote terminates the session in block 130 by issuing the on-hook command to the base in block 128. The Remote then goes to stand by mode in block 132.

If upon entering the Active mode, the link attempt with the base failed in block 104, the remote tries again on the next table in the optimized channel table in block 106. If that is successful in block 108, the remote goes to the exchange ID code section in block 112, if it fails it tries again on the next best channel through blocks 110 and 106. If it fails in three successive attempts, the remote will beep three times in block 116 and go to stand by mode in block 122.

In addition to supporting the modem link, on going link quality updates may be sent to the base and vice versa through the use of a secondary order wire channel. If it is deemed unsuitable, the unit may initiate a channel change.

Incoming Call Mode

Figure 3:
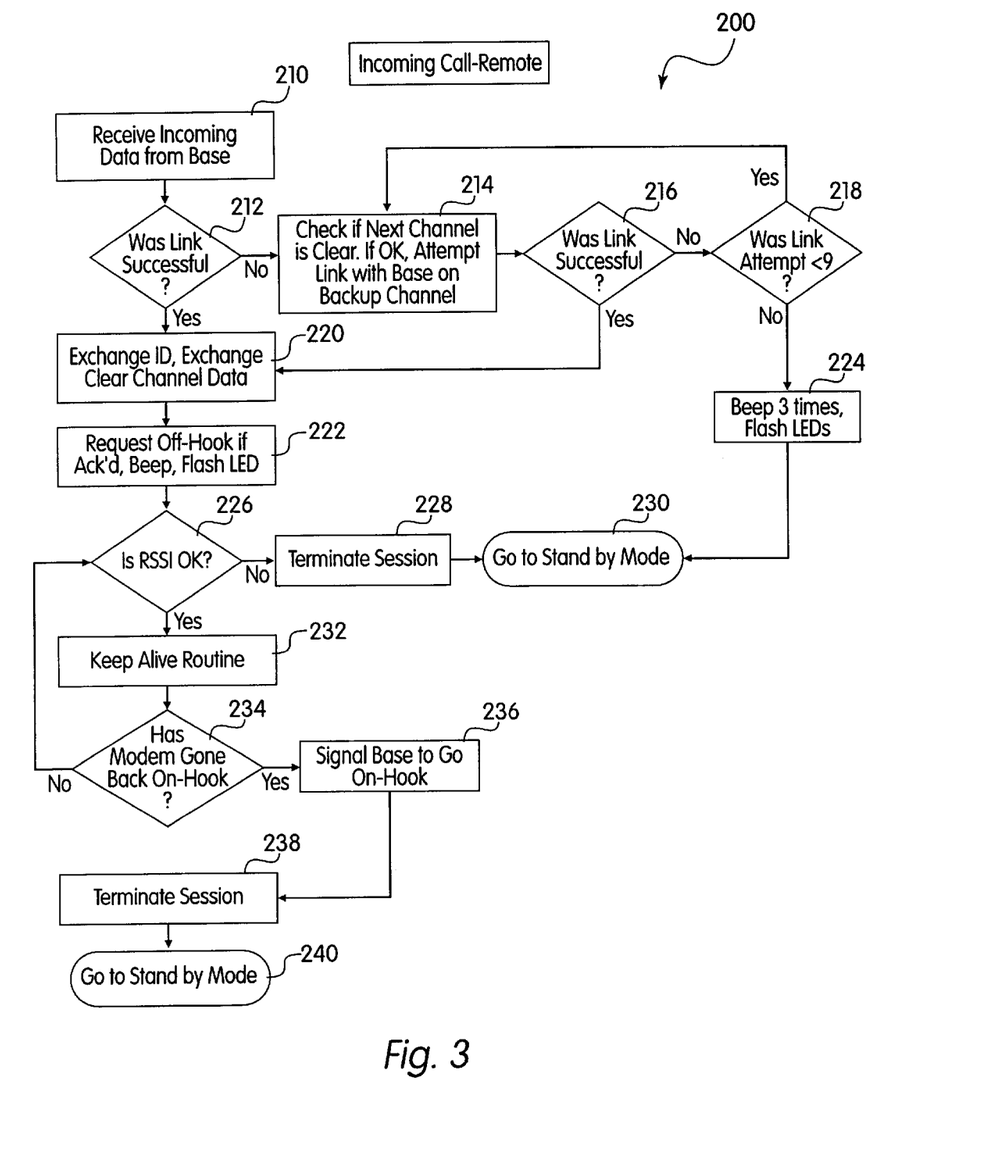
FIG. 3 is a block diagram of an incoming call mode for the cordless or wireless system in accordance with the present invention.

Referring to FIG. 3, if while in stand by mode the remote is contacted by the base in block 210, the remote goes into incoming call mode. In this mode, if there is a successful link established with the base in block 212, then the remote and base exchange ID codes for security reasons then clear channel table information in block 220. The base requests an off-hook condition from the remote in block 222. If this is acknowledged the remote will beep as the ring indication to the user as well as flash the LED. In block 226, the remote begins monitoring the RSSI and if it remains in an acceptable region, the call is continued in block 234. If the RSSI drops below acceptable for >30 seconds, for example, the remote will beep three times and terminate the call in block 228 by signaling the base and then going to stand by mode in block 230.

If during the initial link establishment in block 212, the link fails the base attempts again to establish the link on the back up channel in block 214. If this fails in block 216 the remote will try again on the next best channel and if it fails the third consecutive attempt in block 218, the remote beeps three times and LEDs flash in block 224, and attempted link will terminate and the remote and base will go to stand by mode in block 230.

Base Protocol

Figure 4:
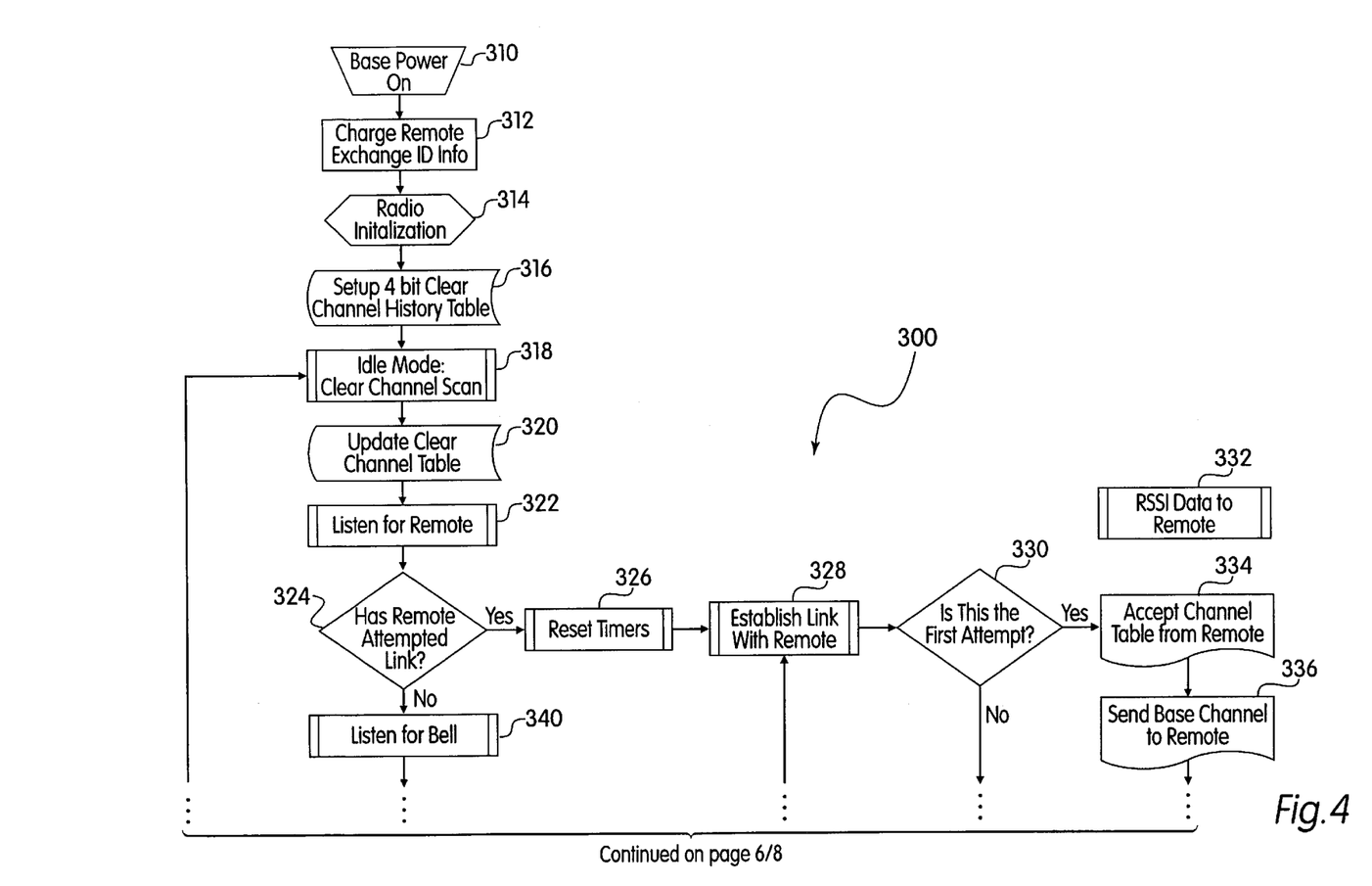
FIG. 4 is a block diagram of a b base protocol for the cordless or wireless system in accordance with the present invention.

Referring now to FIG. 4, a flow chart 300 of a protocol for the base is shown. To start, the base is connected to a power source in block 310. The remote sits or is cradled on the base in a fashion that allows it to be in electrical contact with the base for the purposes of charging the battery or exchanging ID codes etc. in block 312 This is considered the stowed position and idle mode. When the remote is removed from the cradle and switched on either manually or automatically, it is now considered in a standby mode. When a call is initiated from either the remote or from the base, it is considered in the active mode.

All counters, radio devices like synthesizers, registers, etc. are initialized in block 314. A history table is established in block 316 for later use. The base immediately begins a search algorithm in two dimensions. First, it checks to see if it has a valid ID Code and a successful ID code is exchanged with the remote. If it contains a valid ID code, it next begins a frequency scan of all its available channels in block 318, in this example, ten channels. The history table is updated in block 320, and the base listens for the remote in block 322. Since the base is not transmitting, the remote will know whether a channel is busy or clear. The same procedure is completed for the base as described above for the remote.

At start up the history table is created and initialized, then updated every ten seconds until the units are powered off. After this table is created at start up, a random selection of the available best channels is made. A second choice is also made in case the priority channel ends up jammed. At this point the remote will attempt a link with the base unit in block 324. The controller sets up the correct frequencies for the selected channel and sends an FSK preamble and code Omni-directionally. If a base is online i.e. listening, it will hear the remote's code in block 340 and respond in block 346. The base is always in a listen mode unless it hears a remote unit's code at which point it responds with the appropriate acknowledgment code. If the remote receives this code, it acknowledges the receipt to the base unit and then the base waits for instructions from the remote.

If there is an incoming call block 344 sends the incoming call to the remote in block 346. Otherwise if the timer has expired as determined in block 348 the base goes back into listen only mode in block 350. An attempt to locate the remote is performed in block 352. If located, the timers are reset in block 354 and an attempt to establish a link is performed in block 328 or the link is shut down in block 358. If the remote is not detected in block 352, the base returns to listen mode in block 350. If time has not yet expired in block 348 the base returns to idle mode in block 318.

If the remote has attempted a link in block 324, the timers are reset in block 326 and the link is established with the remote in block 328. If this is the first attempt to establish the link in block 330, then history table data is accepted from the remote in block 334 and history table is sent to the remote from the base in block 336. Blocks 330 and 336 both lead into block 338 where a link termination event is awaited. The link is then terminated in block 356 and a link shut down is performed in block 358. The base now returns to idle mode in block 318.

Base Incoming Call Routine

Figure 5:
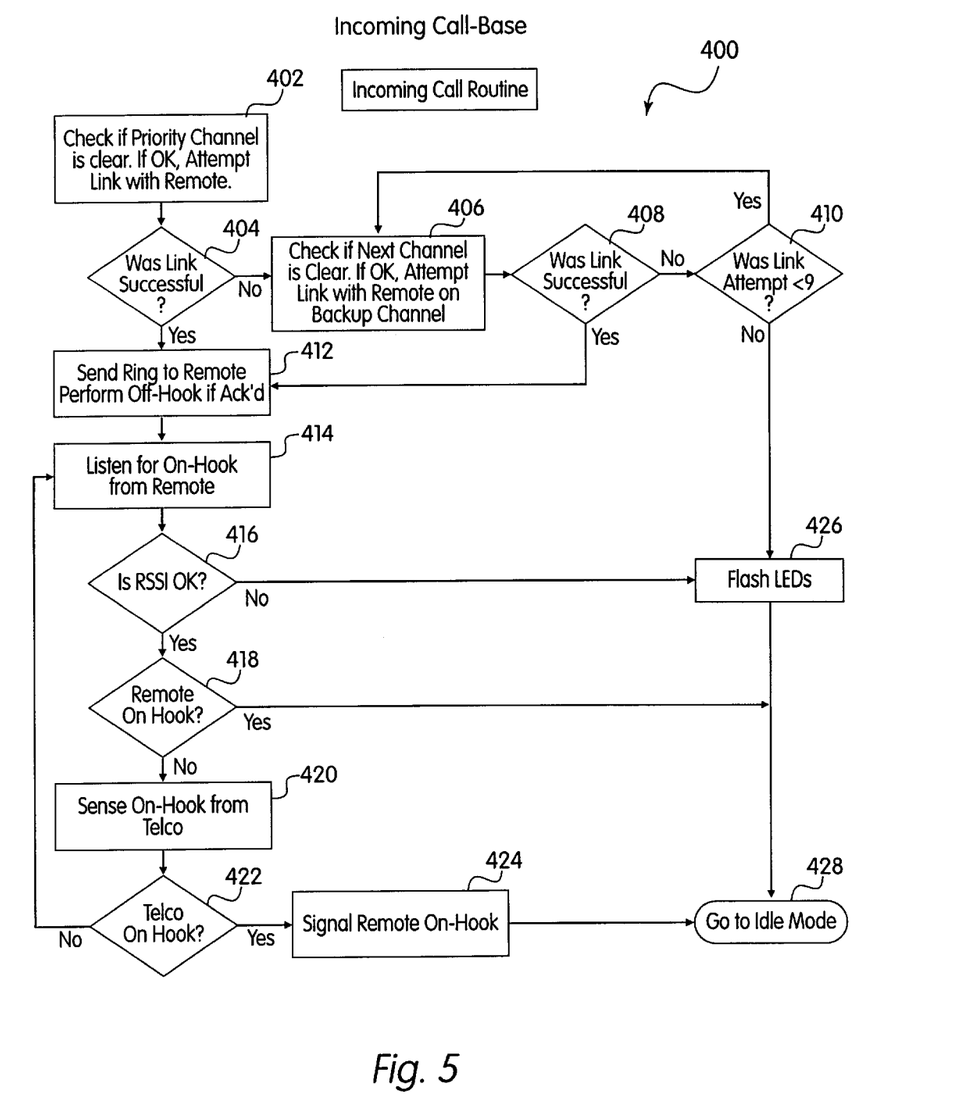
FIG. 5 is a block diagram of an in coming call mode for the cordless or wireless system in accordance with the present invention.

Referring to FIG. 5, if while in stand by mode the remote is contacted by the base in block 402, the remote goes into incoming call mode. A link is attempted to the remote. If there is a successful link established with the remote in block 404, then the remote and base exchange ID codes for security reasons then history table information. The base requests an off-hook condition from the remote in block 412. If this is acknowledged, the remote will beep as the ring indication to the user as well as flash the LED. In block 414, the base listens for an on-hook signal from the remote. The remote begins monitoring the RSSI and if it remains in an acceptable region, the call is continued in block 418 where the on-hook status of the remote is checked. If the remote is on-hook the base goes to idle mode in block 428. Otherwise the on-hook signal is received from the telephone company. If the telephone company is on-hook in block 422 the remote is signaled in block 424 and the base is returned to idle mode in block 428.

If the RSSI drops below acceptable for >30 seconds, for example, the remote will beep three times and terminate the call by signaling the base in block 416. In block 426, LEDs flash in response to the RSSI signal and call termination.

If during the initial link establishment in block 404, the link fails, the base attempts again to establish the link on the back up channel in block 406. If this fails in block 408, the remote will try again on the next best channel and if it fails the third consecutive attempt in block 410, LEDs flash in block 426, and the attempted link will terminate and the base will go to idle mode in block 428. If the link attempt in block 408 is successful, a ring is sent to the remote in block 412.

Having described preferred embodiments of a novel cordless or wireless system protocol (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by letters patent is set forth in the appended claims.

What is claimed is:

1. A method of channel selection between a remote and a base for a cordless or wireless communication system comprising the steps of:

creating a history table having channels assigned to columns and time intervals assigned to rows;

scanning the channels to determine interference;

recording the channels having interference for a given time interval in the history table;

repeating the steps of scanning and recording for a predetermined number of time intervals;

analyzing each channel over said plurality of time intervals; and determining which channel has a least amount of interference over said predetermined number of time intervals to select a best channel for communications.

2. The method as recited in claim 1 further comprises an RSSI and the step of scanning the channels includes outputting a voltage from the RSSI proportional to the interference for each channel.

3. The method as recited in claim 1 wherein the step of recording the channels having interference further comprises the step of measuring relative levels of interference for creating a weighting factor for determining the best channel for communications.

4. The method as recited in claim 1 wherein the step of creating a history table includes the steps of:

creating a first history table for the remote;

creating a second history table for the base; and logically combining the first history table with the second history table.

5. The method as recited in claim 4 wherein the step of logically combining includes logically combining, by an OR gate, interference data in the rows and the columns of the first history table with interference data in the corresponding rows and columns of the second history table.

6. The method as recited in claim 1 wherein the step of determining which channel has the least amount of interference includes determining a backup channel having the least amount of interference of the remaining channels.

7. The method as recited in claim 1 further comprises the step of communicating between the remote and the base on the channel having the least amount of interference.

8. The method as recited in claim 7 further comprises the steps of:
   periodically updating the history table to determine an updated channel having the least amount of interference; and
   communicating between the remote and base on the updated channel.

9. The method as recited in claim 1 wherein the remote is a hand held device.

10. The method as recited in claim 1 wherein the base connects to a public switched telephone network (PSTN).

11. The method as recited in claim 1 wherein the remote is a modem.

12. The method as recited in claim 1 wherein the base is a computer and connects to a public switched telephone network (PSTN).

13. The method as recited in claim 1 wherein the history table has a predetermined number of channels for a predetermined number of intervals and includes the step of erasing interference data for the oldest interval to allow interference data for a new interval to be recorded in the history table.

14. A method of channel selection between a remote and a base for a cordless or wireless communication system comprising the steps of:
   creating a first history table for the remote having channels assigned to columns and time intervals assigned to rows;
   creating a second history table for the base having channels assigned to columns and time intervals assigned to rows;
   scanning the channels to determine interference;
   recording the channels having interference and relative levels of interference for each channel, for a given time interval, in the first history table and the second history table;
   repeating the steps of scanning and recording for a predetermined number of time intervals for said first history and said second history table;
   analyzing each channel over said plurality of time intervals;
   logically combining the first history table with the second history table to create a combined history table; and
   determining which channel has the least amount of interference over said predetermined number of time intervals to select the best channel for communications.

15. The method as recited in claim 14 wherein the step of recording the channels further comprises the step of creating a weighing factor based on the relative levels of interference to determine the best channel for communications.

16. The method as recited in claim 14 further comprises an RSSI and the step of scanning the channels includes outputting a voltage from the RSSI proportional to the interference for each channel.

17. The method as recited in claim 14 wherein the step of logically combining includes logically combining by an OR gate interference data in the rows and the columns of the first history table with interference data in the corresponding rows and columns of the second history table.

18. The method as recited in claim 14 wherein the step of determining which channel has the least amount of interference includes determining a backup channel having the least amount of interference of the remaining channels.

19. The method as recited in claim 14 further comprises the step of communicating between the remote and the base on the channel having the least amount of interference.

20. The method as recited in claim 14 further comprises the steps of:
   periodically updating the combined history table to determine an updated channel having the least amount of interference; and
   communicating between the remote and base on the updated channel.

21. The method as recited in claim 14 wherein the remote is a hand held device.

22. The method as recited in claim 14 wherein the base connects to a public switched telephone network (PSTN).

23. The method as recited in claim 14 wherein the remote is a modem.

24. The method as recited in claim 14 wherein the base is a computer and connects to a public switched telephone network (PSTN).

25. The method as recited in claim 14 wherein the combined history table has a predetermined number of channels for a predetermined number of intervals and includes the step of erasing interference data for the oldest interval to allow interference data for a new interval to be recorded in the combined history table.

26. A method of channel selection between a remote and a base station for a cordless or wireless communication system comprising the steps of:
   creating a first history table for the remote having channels assigned to columns and time intervals assigned to rows;
   creating a second history table for the base having channels assigned to columns and time intervals assigned to rows;
   scanning the channels to determine interference;
   outputting a voltage from the RSSI proportional to the interference for each channel;
   recording the channels having interference and relative levels of interference for each channel, for a given time interval, in the first history table and the second history table;
   repeating the steps of scanning and recording for a predetermined number of time intervals for said first history table and said second history table;
   logically combining the first history table with the second history table to create a combined history table;
   analyzing which channel has the least amount of interference over said predetermined number of time intervals to select the best channel for communications;
   communicating between the remote and the base on the channel having the least amount of interference; and
   determining a backup channel having the least amount of interference of the remaining channels.

27. The method as recited in claim 26 wherein the step of recording the channels further comprises the step of creating a weighing factor based on the relative levels of interference to determine the best channel for communications.

28. The method as recited in claim 26 wherein the step of logically combining includes logically combining by an OR gate interference data in the rows and the columns of the first history table with interference data in the corresponding rows and columns of the second history table.

29. The method as recited in claim 26 further comprises the steps of:
   periodically updating the combined history table to determine an updated channel having the least amount of interference; and
   communicating between the remote and base on the updated channel.

30. The method as recited in claim 26 wherein the remote is a hand held device.

31. The method as recited in claim 26 wherein the base connects to a public switched telephone network (PSTN).

32. The method as recited in claim 26 wherein the remote is a modem.

33. The method as recited in claim 26 wherein the base is a computer and connects to a public switched telephone network (PSTN).

34. The method as recited in claim 26 wherein the combined history table has a predetermined number of channels for a predetermined number of intervals and includes the step of erasing interference data for the oldest interval to allow interference data for a new interval to be recorded in the combined history table.

* * * * *